A. T. STURT.
BRAKE MECHANISM FOR MOTOR VEHICLES.
APPLICATION FILED FEB. 2, 1920.
1,431,131
Patented Oct. 3, 1922.
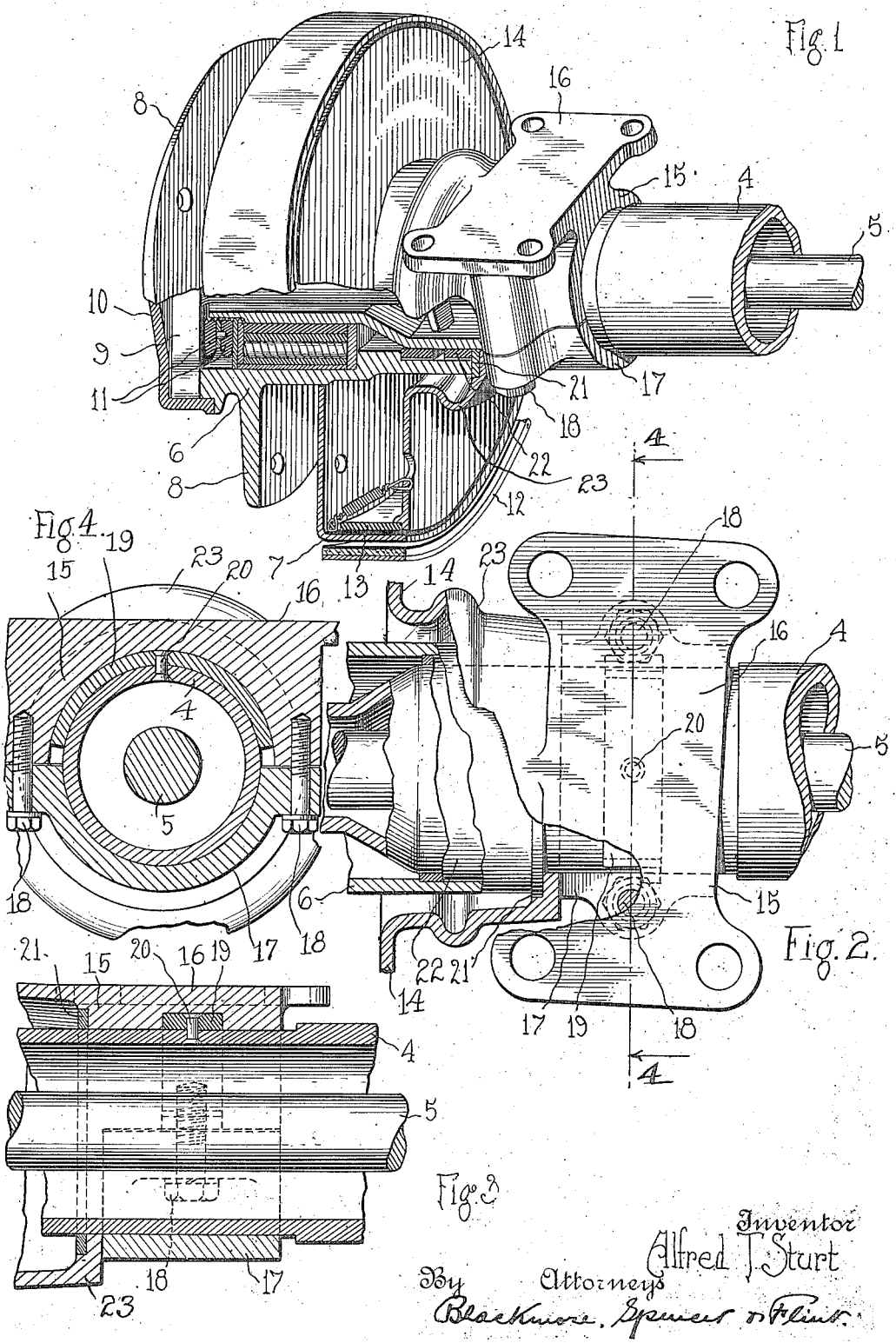

Patented Oct. 3, 1922.

1,431,131

UNITED STATES PATENT OFFICE.

ALFRED T. STURT, OF NEW YORK, N. Y., ASSIGNOR TO GENERAL MOTORS CORPORATION, OF DETROIT, MICHIGAN, A CORPORATION OF DELAWARE.

BRAKE MECHANISM FOR MOTOR VEHICLES.

Application filed February 2, 1920. Serial No. 355,577.

*To all whom it may concern:*

Be it known that I, ALFRED T. STURT, a citizen of the United States, and a resident of New York, county of New York, and State of New York, have invented certain new and useful Improvements in Brake Mechanism for Motor Vehicles, of which the following is a full, clear, concise, and exact description, such as will enable others skilled in the art to which the invention relates to make and use the same, reference being made therein to the accompanying drawings, which form a part of this specification.

My invention relates to brake mechanism designed for use in connection with automobiles and similar self-propelled vehicles; and the object thereof is to provide an improved combined spring supporting pad or spring seat and supporting disc for certain elements of the brake mechanism of the vehicle, the said brake mechanism supporting disc and spring seat being connected with one another to thereby provide a single unitary structure and said members being preferably formed integrally with one another as a single casting.

A further object of my invention is to provide a combined spring supporting seat or spring pad and disc or plate for carrying the brake mechanism of the vehicle and in which the stresses which are set up when the brake is applied to retard the motion of the vehicle will be transmitted directly to the spring supporting seat, and through said seat and the spring supported thereby to the body of the vehicle, as distinguished from transmitted to the axle housing of the vehicle as has heretofore commonly been the case.

A further object of my invention is to provide an improved integral combined spring seat and brake supporting flange or disc which will be simple in construction and one which may be readily manufactured at a minimum of trouble and expense, and which at the same time will be of maximum strength and suitable for the purpose for which it is designed.

My improved combined spring seat and brake flange is illustrated in its preferred form in a drawing accompanying and forming a part of this specification; although it will be appreciated that the same may be modified in various particulars, and that my invention includes such variations and modifications of the particular embodiment thereof illustrated as come within the scope of the concluding claims wherein the distinguishing features of my invention are particularly pointed out.

In the drawing:

Figure 1 is a view for the most part in perspective showing my invention, and the relation thereof to the rear axle of the vehicle with which it is used, certain portions being broken away and shown in section to better illustrate the features of construction thereof.

Figure 2 is a plan view broken away in part to show certain features of my invention.

Figure 3 is a view showing a section upon a vertical plane extending longitudinally of the rear axle housing of the vehicle; all the views being fragmentary in that they show so much only of the co-operating elements of the vehicle as is necessary to an understanding of my invention. Figure 4 is a view showing a section upon a transverse plane, indicated at the lines 4—4, Figure 2.

Referring now to the drawing, the reference numeral 4 designates one end of the usual rear axle housing or axle tube of a motor vehicle within and along which the driving axle of the vehicle extends, one only of the two driving axles which together form the rear driving axle of the vehicle being shown at 5. It will be appreciated that two such axles are arranged within the rear axle tube or housing of a vehicle in each case, said axles being independently driven through the usual differential gear commonly present in rear axle constructions, but which differential gearing is not shown; as my invention may be readily understood upon illustrating and describing the connection or association thereof with one end only of the axle housing, and with a single one of the two driving axles of the vehicle.

Supported upon the outer end of the axle housing 4 is a hub 6 which serves as a support for the inner ends of the spokes of a rear driving wheel of the vehicle, a suitable roller or other type of bearing being commonly interposed between the hub and the periphery of the axle tube. Secured to and rotating with the said hub is a brake drum 7 with the periphery of which the brakes commonly present in rear axle constructions co-operate to retard the motion of the vehicle, the spokes of the wheel being disposed between the brake drum and a laterally extending flange 8 of the hub, as is usual in motor vehicle driving wheel construction. The hub 6 and, as necessarily follows, the wheel and brake drum are driven from the axle 5 through a cross-bar 9 at the extremity of the axle and the ends of which lie within recesses provided in the end of the hub; and a suitable hub-cap 10 is provided for covering the end of the axle and of the driving cross-bar upon the outer end thereof. The wheel in its entirety is held in place upon the end of the axle housing by means of nuts 11, as is usual in motor vehicle wheel construction. It will be appreciated, however, that the details of hub and axle construction and the particular method of driving the wheel from the axle is quite immaterial and forms no part of the invention to which this present application relates.

The brake mechanism which co-operates with the periphery of the brake drum 7 is shown as including an external brake band 12, a portion only of which is shown, and an internal brake band 13 which is also shown in a fragmentary manner; both of said brake bands being supported from a brake mechanism supporting flange or disc 14 so that the said flange acts to prevent rotation of the brake bands in question when said bands are forced into engagement with the periphery of the brake drum; the brake band 12 being drawn inwardly and the brake band 13 being forced outwardly against the brake drum by suitable mechanism co-operating with the band in question and supported in whole or in part by the flange 14 above mentioned. Ordinarily one of the brake bands above referred to is employed as a service brake for use in the ordinary operation of the vehicle, while the other band is usually employed as an emergency brake; although it will be appreciated that this present invention is in no way concerned with the details of construction, arrangement, and operation of the brake mechanism, so long as said mechanism is supported by the brake mechanism supporting flange or disc 14, and so long as said flange serves as an abutment for preventing rotation of the brake members when they are forced into engagement with the brake drum.

The brake supporting flange 14 is itself supported from a spring supporting member or spring seat 15 having a flat or substantially flat upper surface 16 to which a spring of the vehicle may be secured, from which it follows that the strains which result when the brakes are applied to the brake drum and which set up forces which tend to rotate the brake supporting flange 14, will be transmitted to the spring supporting seat 15 and through the said spring seat to the spring of the vehicle supported thereby and to the frame of the vehicle; the spring supporting seat being preferably loosely secured to the axle tube or housing so that the stresses which result when the brakes are applied will not be communicated to the axle tube or housing.

The supporting flange 14 and spring seat 15 are preferably made integrally with one another; and said spring seat is curved upon its underside, as shown in the drawing, and rests upon and is supported by the axle tube 4, which axle tube extends through an opening provided in the said flange, or rather in the inner portion of the hub thereof which merges with the spring supporting seat; the brake supporting flange or disc being substantially annular in form as will be appreciated and forming in substance a closure for the inner open end of the brake drum 7.

The spring seat 15 and the supporting flange 14 are secured in place upon and relative to the axle housing 4 by means of a detachable cap member 17; which cap is secured to the spring seat by means of bolts 18 disposed one upon each side of the axle tube, as shown in dotted lines in Figure 2 and the lower end of one of which bolts is shown in Figure 1; from which it follows that the spring supporting seat and flange after having been placed in position upon the axle tube may be properly fastened in place relative thereto by means of the cap and the bolts. It will be appreciated, however, that the clamping action due to the tightening of the bolts is commonly not sufficient to secure the parts together in such a manner that they will be immovable relative to one another, as the torsional forces due to the application of the brakes are ordinarily intended to be transmitted from the spring seat through the spring supported thereby and to the frame of the vehicle as distinguished from to the axle tube; although the spring seat and flange 14 may be secured so firmly to the axle tube as to transmit the torsional stresses due to the application of the brakes to the axle housing should such an arrangement and operation be deemed preferable or desirable.

Movement of the spring seat 15 and of the flange 14 carried thereby longitudinally of the axle tube is prevented by a key 19 which is fixedly secured to the said tube as by means of rivets 20, and which key extends throughout something less than half the circumference of the tube at the place where the spring seat rests thereupon. The spring seat is provided with an internal groove which receives this key when the parts are assembled, as best shown in Figure 3; the assembling of the spring seat and brake mechanism supporting flange with the axle tube being accomplished by passing the spring seat and flange over the end of the tube with the flat portion 16 turned downwardly, referring to Figure 1, and then turning the spring seat and flange throughout half a rotation to thereby bring the internal groove in the spring seat into a position enclosing the key, after which the detachable securing cap is put in place and secured to the spring seat by the bolts 18 as above explained.

The inner end of the wheel hub 6 abuts against a radially extending portion of the hub of the brake mechanism supporting member 14 adjacent the point at which said member, or rather the hub thereof, merges with the spring seat; and an annular wearing plate or ring 21 is preferably interposed between the abutting portions of the members in question to thereby reduce the friction between the parts and provide a member which may be removed and another substituted therefor if and when it becomes worn, and a supplemental bearing in the form of a ring 22 is preferably interposed between the inner end of said wheel hub and the adjacent peripheral surface of the axle tube.

In view of the premises it will be appreciated that my invention provides an improved brake mechanism in which the spring supporting seat and the annular flange or disc which supports the brake bands or equivalent brake mechanism may be formed as a single integral casting, which may be readily made at a minimum of expense and readily assembled with the axle tube of the rear axle structure, and then secured in place relative to said tube; and provides a construction in which the torsional stresses which are set up when the brake bands or equivalent elements are applied to the brake drum are transmitted through the supporting disc or plate to the spring seat, and through said seat and the spring carried thereby to the frame of the vehicle, as distinguished from transmitted to the axle tube or housing as has heretofore been the case in similar mechanisms wherein the brake supporting disc or flange the equivalent to the flange 14 has usually been permanently or fixedly secured to the rear axle housing, so as to be immovable relatively thereto in an angular direction.

Having thus described and explained my invention I claim and desire to secure by Letters Patent:

1. In a device of the class described and in combination with an axle tube or housing, a spring seat curved to conform with and which seat rests upon said axle tube; a separable cap member shaped to conform with said axle tube; means for detachably securing said cap to said spring seat; a brake mechanism supporting flange annular in form carried by said spring seat and having an opening through which said axle tube extends; a wheel hub supported upon the free end of said axle tube, and the inner end of which abuts against said brake mechanism supporting flange; and a brake drum supported from said hub and the periphery of which lies adjacent said flange.

2. In a device of the class described and in combination with an axle tube or housing having a curved key secured to its peripheral surface; a spring seat curved to conform with and which seat rests upon said axle tube and is provided with an internal recess within which said key lies; a separable cap member shaped to conform with said axle tube; means for detachably securing said cap to said spring seat; and a brake mechanism supporting flange annular in form carried by said spring seat and having an opening through which said axle tube extends.

3. In a device of the class described and in combination with an axle tube or housing, a spring seat curved to conform with and which seat rests upon said axle tube; a separable cap member shaped to conform with said axle tube; means for detachably securing said cap to said spring seat; and a brake mechanism supporting flange annular in form formed integrally with said spring seat and having an opening through which said axle tube extends.

4. In a device of the class described and in combination with an axle tube or housing, a spring seat curved to conform with and which seat rests upon said axle tube; a separate cap member shaped to conform with said axle tube; means for detachably securing said cap to said spring seat; and a brake mechanism supporting flange carried by said spring seat and having an opening through which said axle tube extends.

5. In a device of the class described and in combination with an axle tube or housing, a spring seat curved to conform with and which seat is supported by said axle tube; a separable cap member shaped to conform with said axle tube; means for detachably securing said cap to said spring seat; and a brake mechanism supporting flange formed integrally with said spring seat.

6. In a device of the class described and in combination with an axle tube or housing, brake mechanism supporting means supported by said axle tube and capable of angular movement independently thereof; spring supporting means formed integrally with said brake mechanism supporting means; and means for holding said brake mechanism supporting means and said spring supporting means in place upon and relative to said axle tube or housing.

7. In a device of the class described and in combination with an axle tube or housing, a spring seat supported by said housing and which spring seat is loose upon said housing, so as to be capable of angular movement independently thereof; a brake supporting flange carried by said spring seat and adapted to support suitable brake mechanism; and means for securing said spring seat and brake supporting flange to said axle housing.

In testimony whereof I affix my signature.

ALFRED T. STURT.